United States Patent [19]

Newton et al.

[11] 3,973,284

[45] Aug. 10, 1976

[54] METHODS OF STIFFENING A SHOE COMPONENT

[75] Inventors: Albert E. Newton, Beverly; Roger L. Farnum, Peabody; Nicholas J. Gelsomini, Ipswich, all of Mass.

[73] Assignee: USM Corporation, Boston, Mass.

[22] Filed: Mar. 18, 1975

[21] Appl. No.: 559,584

Related U.S. Application Data

[63] Continuation of Ser. No. 399,464, Sept. 20, 1973, abandoned.

[52] U.S. Cl. .............................................. 12/146 D
[51] Int. Cl.² ...................................... A43D 00/00
[58] Field of Search ..................... 12/146 D; 36/68; 156/276, 308, 309; 264/244; 161/112

[56] References Cited
UNITED STATES PATENTS

| | | | |
|---|---|---|---|
| 2,709,312 | 5/1955 | Crowell | 36/68 |
| 3,238,089 | 3/1966 | Griswold | 12/146 D |
| 3,259,536 | 7/1966 | Gaeth et al. | 264/244 |
| 3,605,152 | 9/1971 | Becker | 12/146 D |
| 3,734,814 | 5/1973 | Davis et al. | 161/112 |
| 3,749,626 | 7/1973 | Andrews et al. | 156/276 |

*Primary Examiner*—Patrick D. Lawson
*Attorney, Agent, or Firm*—Benjamin C. Pollard; Vincent A. White; Richard B. Megley

[57] ABSTRACT

The method of stiffening a selected area of a shoe component of flexible sheet material in which a layer of molten synthetic polymeric material is coated on the area to be stiffened, rigid, preferably heat-softenable, granules are applied to the coating layer while the coating material is soft to cause the granules to adhere, and the shoe component is pressed against a second flexible shoe component with the coating and granules between the parts and with the coating in heat softened condition to force the coating material through openings between the granules and into wetting engagement with the second shoe component. The assembled shoe components may then be shaped and the polymeric material cooled to form a layer of hardened polymeric material with the granules locked in it as reinforcing stiffening bodies.

8 Claims, 5 Drawing Figures

METHODS OF STIFFENING A SHOE COMPONENT

This is a continuation application U.S. application Ser. No. 399,464, filed Sept. 20, 1973, now abandoned.

FIELD OF THE INVENTION

The present invention relates to a method for stiffening selected areas of flexible shoe components.

BACKGROUND OF THE INVENTION

In the stiffening of selected areas of shoe uppers, particularly the toe and heel ends for the purpose of preserving a desired shape, a well accepted method is that forming the subject matter of the U.S. Pat. No. 3,316,573 to Chaplick and Rossitto, dated May 2, 1967 in which molten resin is applied as a thin layer to the portion to be stiffened and is cooled to stiff, resilient condition. When the shoe includes a lining, the lining may be pressed against the resin while the resin is still tacky and adhesive to bond the lining in place in the shoe.

Shoes of which portions have been stiffened by the process of the patent have been found very satisfactory for most purposes. However, particularly for men's shoes, and in shoe counters, greater stiffness and strength are sometimes desirable. This need cannot be met by simply using a thicker layer of resin because of difficulties of maintaining interior smoothness because of bubbles entrapped in the resin as well as difficulties in shoemaking and in breakdown in the finished shoe.

SUMMARY OF THE INVENTION

It is an object of the present invention to provide a method for stiffening areas of shoe components of flexible sheet material in which the advantages of the hot melt stiffening method are retained but in which there is formed a stiffened component having greater stiffness and resistance to breakdown.

To this end and in accordance with a feature of the present invention, a coating of molten synthetic polymeric material is laid down on the area of the shoe component to be stiffened, granules of rigid, preferably heat-softenable, material are applied to the coating while the coating is soft to cause granules to adhere and the shoe component is pressed against a second shoe component with the coating and granules between them and with the coating in heat softened condition. The pressure forces the softened coating material through openings between the granules and into wetting adhesive engagement with the second shoe component. The shoe component may then be shaped with the polymeric material in heated condition and the assembly cooled. On cooling, the polymeric material, granules and shoe components are united into a strong, breakdown-resistant stiffened composite which will retain its shape against deforming stresses.

The invention will be described in connection with the drawings in which.

In the following disclosure, the invention will be described in connection with the stiffening of shoe components, particularly shoe counters and box toes.

Figure 1:
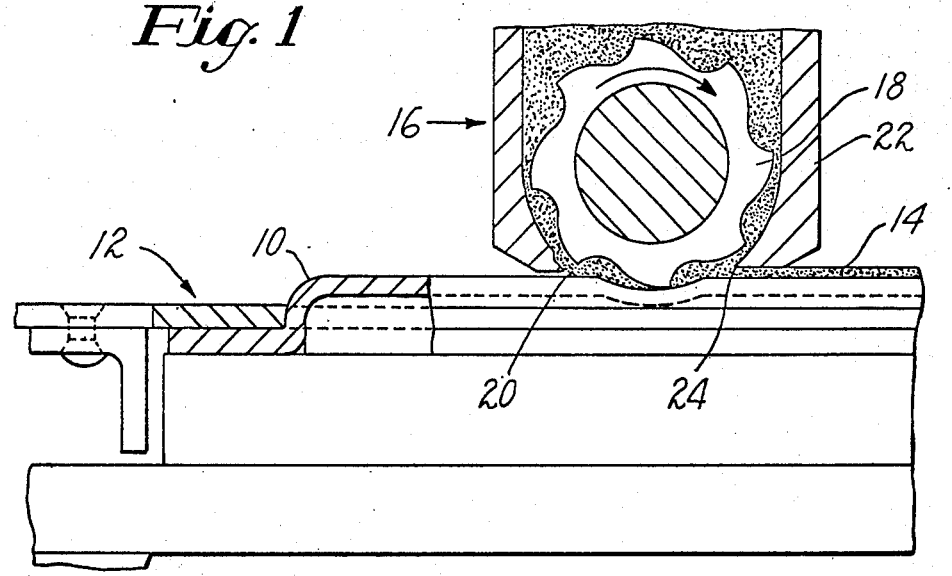
FIG. 1 is an elevational view partially in section showing the application of molten polymeric material to a shoe component and the relation of the polymeric material to the shoe component after coating.

The shoe component 10 to be stiffened, e.g., a shoe component such as the toe or quarter of a shoe upper or counter lining or counter pocket of a shoe upper, is held, ordinarily in generally flat condition, for application of molten polymeric material. It has been found convenient to mount the shoe component 10 in a work holder 12 (see FIG. 1) which supports it with the surface to be treated exposed. A layer 14 of normally stiff, resilient, synthetic polymeric material in viscous molten condition is spread on the exposed surface of the shoe component. Spreading may be carried out by hand but is preferably carried out using a mechanical applicator 16 including a rotating applicator wheel 18 disposed in the otherwise open lower end 20 of a heated chamber 22 containing the molten stiffening material. A metering blade 24 which may be the lower edge of the chamber 22 is adjustable by raising or lowering applicator 16 to control the thickness of the applied material. It will be set to provide a layer 14 containing sufficient of the polymeric material to flow around the granules 26 to be applied and, as shown more clearly in FIG. 4, sufficient to flow into wetting adhesive engagement with the liner 28 in addition to the polymeric material in the spaces 30 between the granules 26. Reference is made to U.S. Pat. No. 3,316,573 referred to above for a more complete description of the work holding means, applicator head and application procedure.

Figure 2:
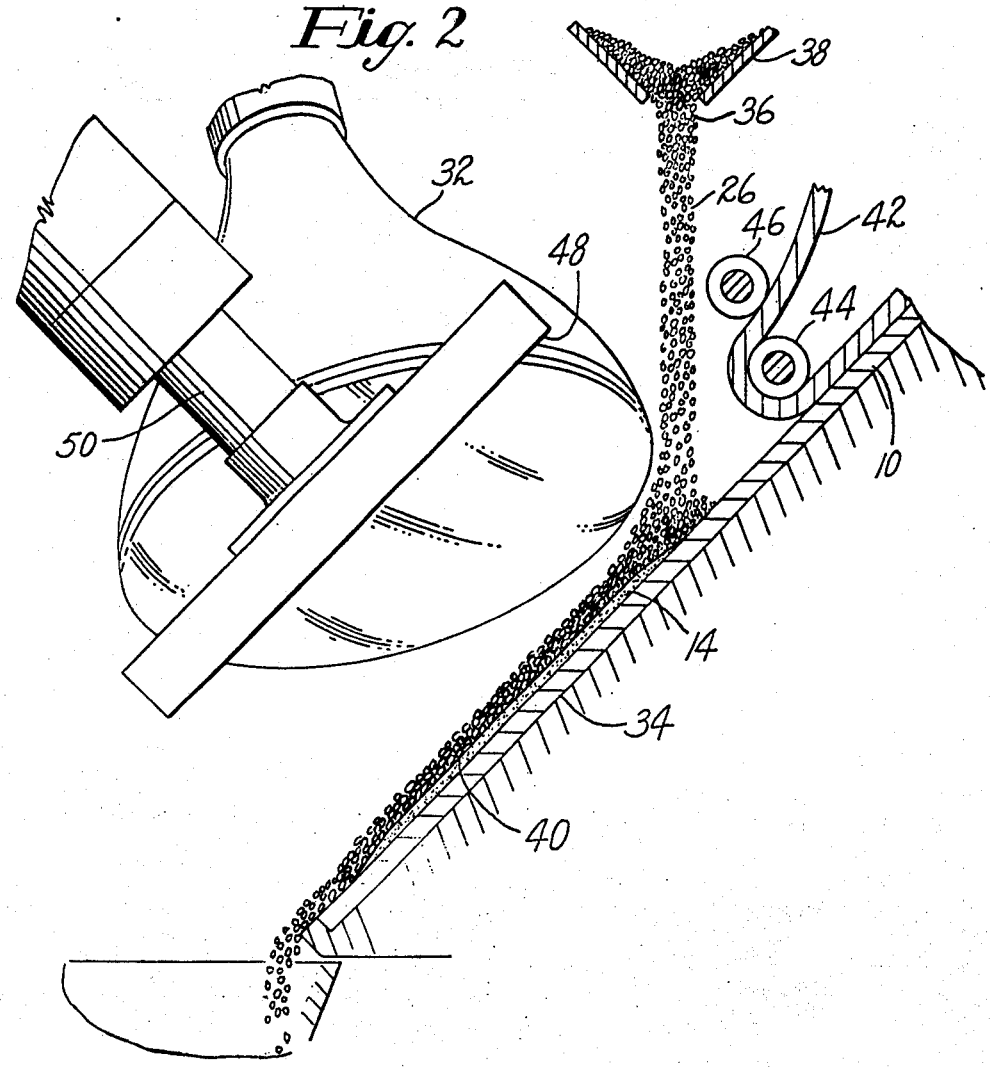
FIG. 2 is an elevational view partly in section showing application of granules on the molten polymeric material coating and an arrangement for layin down and pressing a liner against the granules and coating.

Granules 26 of rigid, preferably heat-softenable, material are applied to the layer 14 as shown in FIG. 2 while the layer 14 is in soft adhesive condition and flowable under pressure. In the preferred operation, the granules are laid down directly after the molten synthetic polymeric material layer 14 is applied so that the layer is still in soft and adhesive condition from retained sensible heat in the body of polymeric material laid down. As shown in FIG. 2, heat, as from one or more heating lamps 32, may be applied to insure that the layer 14 is in suitably soft adhesive condition. It is, however, within the spirit of the invention to bring polymeric material which has cooled and hardened, back to soft adhesive condition by application of further heat to its surface before the granules 26 are applied.

In a preferred granule application precedure as shown in FIG. 2, the shoe component 10 is disposed on an inclined support 34 to receive a stream of granules 26 from a slot 36 in a supply trough 38 while the hot layer 14 of polymeric material is still hot and soft for accepting the granules. The lining 42 is passed around first rod 44 and behind a second rod 46 which holds it out of the way of the stream of granules 26. Particularly with the coated shoe component 10 held at an angle to the horizontal, the granules 26 slide down by gravity over the layer 14 and will adhere on contact to areas where the soft adhesive material is exposed and excess granules will fall off by gravity. In this procedure, a uniform single layer 40 of granules is formed simply and quickly. Other granule applying procedures may be used such as bringing the soft adhesive layer into contact with a body of granules or projecting the granules at the soft adhesive layer.

Figure 3:
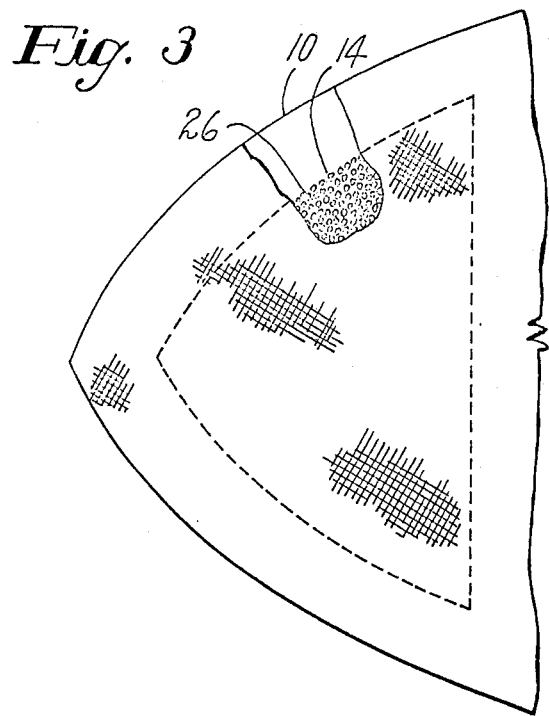
FIG. 3 is a plan view partially in section showing the relation of shoe component, coating, granules and lining after pressing.
Figure 4:
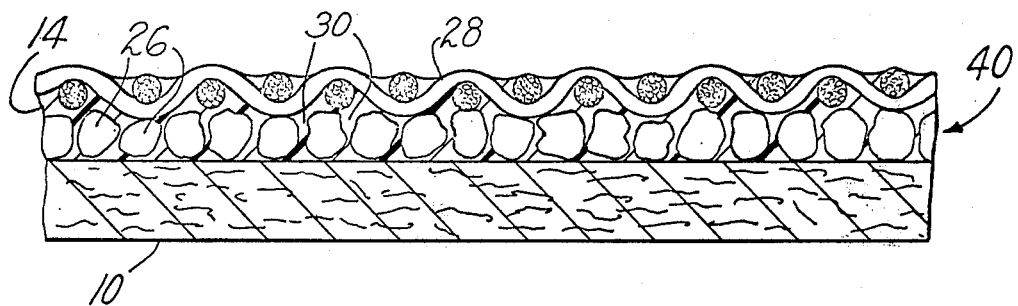
FIG. 4 is a sectional elevational view on an enlarged scale showing the structure of the polymeric material coating in relation to the granules, lining and shoe component.

After the granules have been applied on the layer 14, the lining 42 is brought into engagement with the layer 40 of granules 26 and the assembly is pressed to insure flow of the hot material of layer 14 up through open spaces 30 between and around the granules 26 and into engagement with the lining 42 to form a combined shoe construction as shown in FIGS. 3 and 4. It has been found desirable to direct radiant heat as by lamps at the coating and granules to keep the coating more flowable and to aid in heating and softening the granules until the lining and shoe component are pressed together. In the form of the invention shown, this pressing may be achieved by moving the rods 44 and 46 downward parallel to the support 34 to lay the liner 42 smoothly down on the layer 40 of granules 26 held by the layer 14 on the shoe component. When the rods 44 and 46 have moved past the end of the shoe component 10, the platen 48 is forced down against the liner 42 by the piston 50 to press the liner 42 against the support 34 with the layer 14 of polymeric material and the layer 40 of granules between them. The platen 48 is then raised and the combined shoe component is removed from the support 34.

A wide variety of heat-softenable synthetic polymeric resinous materials may be used to form the layer 14 in the present process. These materials may be either permanently thermoplastic or may be heat-softenable and converted by heat or other means to a higher melting or infusible condition. Among useful materials are the polyesters and copolyesters, polyamides and copolyamides, polyesteramides, polyvinyl compounds, such as polystyrenes, polyvinylacetate and so on. U.S. Pat. No. 3,316,573 above referred to, provides a fuller description of polymeric materials including preferred ranges of softening points and application temperatures useful for forming the stiffener layer in the present method and the disclosure of that patent is incorporated by reference.

Viscosity of the molten material depends on the nature of the polymeric material and on the temperature. In the formation of a layer 14 of polymeric material on a shoe component 10, it is important that the molten material used and the temperature at which it is applied give a viscosity low enough to wet and adhere to the surface on which it is applied but sufficiently high that it will not penetrate through the shoe component to be stiffened. The layer will ordinarily be from about 0.010 inch to about 0.045 inch in thickness.

It is also important that the temperature of the layer 14 of polymeric material at the time when the granules 26 are applied give a viscosity to the polymeric material low enough to wet and adhere to the granules 26 and tha the polymeric material be soft enough to enter the openings 30 between the granules 26 and to flow around the granules 26 when the lining 42 and shoe component 10 are brought together. The desired wetting and spreading properties are secured by using an application temperature for a given polymeric material such that its falling ball viscosity at the application temperature is not less than about 30 seconds as determined with a 3/16 inch steel ball falling through the middle four inches of a column of molten material in a 25 mm. diameter tube, 150 mm. in length.

As shown in FIG. 4, the polymeric material which has flowed into the openings 30 between granules 26 hardens as a solid matrix locking the granules 26 in place and uniting the surface of the shoe component 10 adhesively to the lining 42.

An important feature of the new method is that the layer 14 with the rigid granules 26 locked in provides a substantially greater thickness of stiffening material between shoe upper material 10 and the normally rather firm fabric of the lining 42 than is obtainable with the usual resin layer. This insures displacing structurally strong members, i.e., the shoe upper material 10 and the lining 42 farther from the neutral axis and giving greater stiffness. Also, the layer is constituted of rigid bodies, i.e., the granules 26, locked in the hardened layer 14 of polymeric material and these are effective to provide a multitude of zones which are stiffer and more resistant to bending than intervening areas of the layer 14 of hardened polymeric material so that in addition to the action of the granules in effectively thickening the layer of polymeric material, these zones give an averaged stiffness greater than the stiffness of the polymeric material alone. On the other hand, the intervening areas of polymeric material give an ability to withstand deformation without cracking and to recover resiliently to the predetermined shape. Also, since there is less molten material for the thickness of combined rigid granules and polymeric material, the amount of heat to be dissipated is less and the stiffened layer will cool and harden more rapidly. Furthermore, since the granules, even though somewhat softened by heat, are resistant to deformation, the granules provide a spacing action to resist undue displacement and thinning out of molten polymeric material layer.

Figure 5:
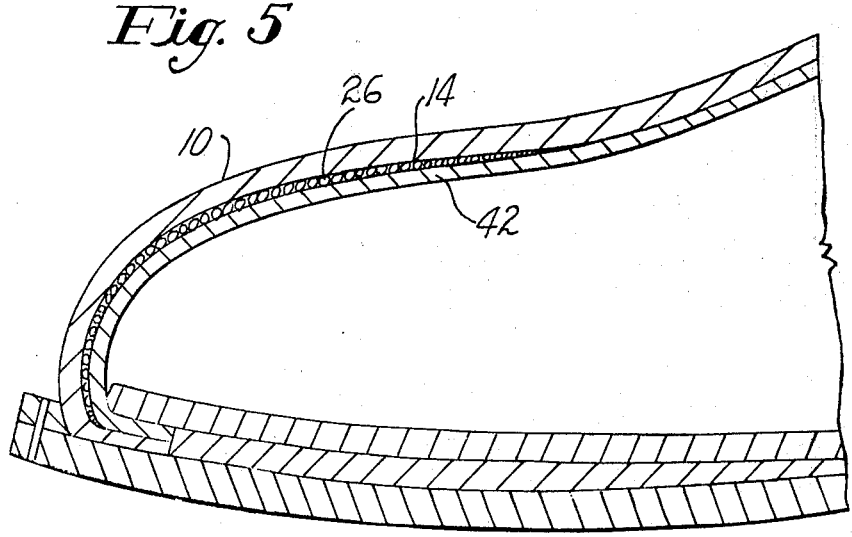
FIG. 5 is a side section with parts broken away of the toe portion of a formed and lasted shoe upper including the stiffened shoe portion and a liner after conformation and consolidation of shoe components.

For completion of a shoe, the portion carrying the layer 14 of polymeric material and granules 26 will ordinarily be reactivated or softened by heating to a moldable but not freely flowable condition at an elevated temperature below the melting point of the polymeric material. This may be done by steaming, radiant heating or combinations of these or other heating procedures and the shoe upper is then subjected to pressure to conform it to the desired shape. For example, the shoe upper may be placed on a last or other shaper with the polymeric stiffener material in heated moldable condition and tension applied to the shoe upper to pull it into firm engagement with the last to shape the stiffener. With the polymeric material in heat softened condition, the pressure of the last acts to join the shoe upper, the layer of polymeric material and granules, and the liner in the desired relation. On cooling, the joined layers of the shoe upper cooperate to give strength and resilient stiffness to retain the shape into which the shoe upper has been put. The so shaped and stiffened shoe support portion (see FIG. 5) has excellent memory, i.e., the ability to return to its original shape after distortion and excellent resistance to buckling or cracking.

Granules for use in the stiffening method are formed of materials which are substantially rigid at the temperatures at whch the stiffener will be used and which will be readily wet and adhered to by the heat-softened polymeric material of the stiffener layer in the course of making the stiffener. The size of the individual granules for effective action is important and will be equivalent to a substantial proportion of the thickness dimension of the layer of polymeric stiffener material, but will not be so great as to hold the second sheet of material, such as the liner in shoe manufacture, so far from the coating of polymeric material as to interfere with wetting adhesive engagement of the second sheet with the heat-softened polymeric material of the layer 14. Additionally, the granules must not be so large as to result in showing of their outlines through the sheet material.

Stiffness of the laminate of shoe upper material, granule and polymeric material layer and liner is very substantially greater than stiffness practically obtainable with stiffener layers of a polymeric material coating alone and may be of the order of three to four times that stiffness. The stiffness is controllable by varying the thickness of the continuous layer of polymeric mateial, by varying the size of the granules and by varying the quantity of the granules. It has been found that the smaller size granules give less stiffening action than do the larger granules. Also the stiffness is controllable by the quantity of granules relative to the polymeric material of the continuous coating. For simplicity of operation, it is usual to pour granules on the molten surface of the polymeric material coating in such amount that a single all over layer of granules adheres to the surface of the coating. Where less stiffening is desired, granules of the polymeric material of the same composition as the coating may be blended in desired proportions with the granules of the rigid material. The effect of this is to provide fewer of the granules of rigid material and a reduced stiffening action even though the entire surface of the molten coating is covered with granules.

The stiffening action of the present granules is basically different from the action of fine powder reinforcing fillers. That is, the fine powder reinforcing fillers are dispersed uniformly through the resin body which they are to stiffen and rigidify the whole body of resin in which they are incorporated. The granules used in the present invention, on the other hand, provide stiff rigid localized areas including the granules and areas close around them, these localized areas being separated by resilient areas of the polymeric material in portions of the layer spaced from the granules. The net effect of these rigid localized areas and intervening resilient areas provides a desired high stiffness coupled with desirable ability to recover from major distorting stress and low brittleness due to the intervening resilient areas.

To give this action, the granules may have a size of at least about ½ to about 2 times, preferably from about 0.60 to about 1.25 times the thickness dimension of the polymeric material coating on which they are deposited and will ordinarily be present in amount of from about one-half the weight up to about a weight equal to the weight of the polymer material with which they are used. Thus, with a polymeric material coating applied in a thickness of about 0.030 inch, granules passing a 16 mesh screen and retained on a 20 mesh screen (from about 0.020 inch to about 0.030 inch) have given excellent stiffening and reinforcing.

Granules useful in the stiffening layer will have a hardness much greater than the hardness of the polymeric material coating with which they are associated. Thus, where the polymeric materials applied as molten coating may have a hardness on the "A scale" of a Shore durometer, the rigid granules may have a hardness greater than that which will be measurable on the "D scale." Granules useable in the process include granules of rigid organic materials, such as thermosetting resins, such as condensates of a phenol and formaldehyde and thermoplastic resins, such as polymers and copolymers of acrylic or methacrylic esters, and inorganic materials, such as glass and hard minerals. It is important that the surface of the granule be wet and adhered by the material of the hot polymeric material coating in order that the granules may exert their stiffening action. This ability may be improved through application of a primer or a surfactant to the surface of the granules. It is also important that the softening point of the granular material not be so low as to be freely fluid in order that it may remain in position and retain its character at the temperature encountered in making the stiffener.

It is preferred to use granules of rigid uncured thermosetting resins. That is, the heat softened polymeric material readily wets the uncured resin and forms an excellent bond to it. Also, the uncured resin is softened by the heat of the polymeric material and by radiant heat where that is used prior to bringing liner and upper together and also by reactivation heat so that granules of the material are deformable by pressure applied to the assembly to enable the granules to adapt their shapes as necessary to give, with the polymeric material, a solid layer, and granule portions at the surface of the sheet materials are deformable by contact with those surfaces so as not to mark through the sheet materials.

Commercially available uncured phenolic resin from condensation of a phenol and formaldehyde such as "2-step" phenolic resins, have been found particularly desirable. It is preferred that the resin granules contain a filler, suitably a fibrous filler such as the cellulosic fiber fillers of the nature of wood flour or fibrous mineral fillers such as asbestos or glass fiber to reduce crumbling of the granules in use. For this purpose, the filler will preferably be present in amount of from about 25% to about 100% by weight based on the weight of the granule.

The following examples are given as of assistance in understanding the invention; but it is to be understood that the invention is not limited to the particular materials, procedures or conditions set forth in the examples.

EXAMPLE 1

A polyamide resin have a Shore durometer hardness of 85 on the "A scale," from condensation of dimerized soybean oil fatty acid with ethylene diamine and having a Ball and Ring softening point of 100°C. to 116°C. and a melt viscosity at 330°F. in the range of 30 to 60 seconds, as determined with a 3/16 inch steel ball falling through the middle 4 inches of a column of molten material in a 25 mm. diameter tube 150 mm. in length was supplied to an applicator of the type described above.

A leather shoe upper was secured with its toe portion in a work holder such as described above with the portion to be stiffened exposed for engagement with the applicator wheel of the applicator. With the temperature of the applicator adjusted to about 350°F., a coating 0.030 inch thick was spread on the area to be stiffened. Thereafter, while the resin was molten, 0.030 inch diameter granules of an uncured, heat softenable thermosetting phenol aldehyde resin containing about 100% by weight of wood flour based on the weight of the resin were poured on the area covered with molten resin and adhered to it as a uniform single layer of granules. These granules had a hardness in excess of that measurable on the Shore durometer, the hardness being M 110 on the Rockwell hardness tester. The softening point of the resin was 115° to 121°C. The liner was then wiped down on the resin granules by a wiper plate and pressure applied to the plate to press the assembly to cause the molten resin to flow around the granules and through the openings between the granules and into wetting adhesive engagement with the liner.

The unlasted shoe upper containing the granule and polyamide layer was subjected to radiant heat for about 60 seconds to bring its temperature to from about 175°F. to about 185°F. Thereafter, the shoe was lasted to shape the toe portion including the heat-softened layer and to combine the parts firmly together. On cooling, the toe portion was stiff, strongly shape retaining. Further operations such as soling, heeling and the like were carried out and the shoe removed from the last.

The toe portion of the shoe was found to have good resilient stiffness and excellent shape recovery even after major distortion, together with superior resistance to cracking.

EXAMPLE 2

The procedure of Example 1 was repeated except that granules of a hard polymethylmethacrylate resin having a melting point of 160° to 165°C. and a range of particle sizes such that the granules would pass a 20 mesh sieve and be retained on a 30 mesh sieve was substituted for the granules of phenol aldehyde resin used in the first example.

In the completed shoe, the toe portion was found to have good reslient stiffness and excellent recovery evem after major distortion.

EXAMPLE 3

The following tests were carried out to show the relation between stiffness of the resin-granule layer and the particle size disribution of the granules and the times and pressures used in combining. The test procedure was that developed for determining relative strengths of shoe stiffeners. Test specimens of a stiffened shoe upper material 3½ inch long by 1 inch width were mounted in a holder having spaced parallel slots in a base, the slots being inclined toward each other at an angle of 45° to the base and the bottoms of the slots being spaced 3 inches apart. The perpendicular distance of the bottom of the slots to the upper face of the holder was ⅝ inch. The specimens were disposed in the holder with their ends at the bottom of the spaced slot and were clamped firmly in the slots. Since the spacing of the bottoms of the slots was less than the length of the test specimens, the specimens in the holder were in a curve comparable to the curve in a toe portion of a shoe. The holder with the specimen clamped in place was placed on the base of an Instron test machine with a pressure member arranged to apply force against the center portion of the bowed specimen. The pressure member was ⅞ inch diameter rod of which the specimenengaging surface was a spherical section of ¾ inch radius. The pressure member was moved down to apply force against the specimen at a rate of 1½ inches per minute and the stiffness value was the pressure in pounds required to depress the central portion of the specimen 0.150 inch. The testing of each specimen involved taking three readings with movement of the pressure member up and down at the same rate. The figures reported in the table are averages of readings from at least three specimens.

Specimens tested according to this Example were prepared by applying a layer of molten resin 0.035 inch in thickness at a temperature of 375°F. to the toe portion of a fabric backed vinyl resin shoe upper material, maintaining the coated surface under heat from two radiant heat lamps, with the lamps spaced about 4 inches above the surface and arranged at the opposite edges of the coated area. Uncured thermosetting phenol formaldehyde resin granules were poured on the area covered by the molten resin and adhered to it as a uniform single layer of granules. A cotton duck liner was then wiped down on the granules by a wiper plate and pressure applied to press the assembly to cause the molten resin to flow around the granules and through the openings between the granules and into wetting adhesive engagement with the liner.

After removal of pressure, specimens 3½ inches long by 1 inch wide were cut from the assembly at a point spaced about ¼ inch from the feather line of the stiffener and the 3½ inches length being taken in a direction transverse to the axis of the shoe upper.

The specimens were placed in the specimen holder and subjected to the test described above.

In the series of tests recorded in the following table, the granule size is given in terms of the numbers of the mesh size through which the material will pass and not pass, the lower number being the mesh size which the granules will pass and the larger number being the mesh size that the granules will not pass.

| Test No. | Particle Size Mesh Range | Laminating Pressure P.S.I. | Pressure Duration Seconds | Stiffness Pounds | Shoe Upper Surface |
|---|---|---|---|---|---|
| 1 | no granules | 60 | 2 | 4.50 | Smooth |
| 2 | 16–20 | 60 | 2 | 11.50 | Smooth |
| 3 | 16–30 | 60 | 2 | 11.00 | Smooth |
| 4 | 16 & finer | 60 | 2 | 7.75 | Smooth |
| 5 | 10–30 | 60 | 2 | 10.80 | Minor roughness at feather line |
| 6 | 10–16 | 60 | 2 | 15.40 | Minor roughness at feather line |
| 7 | 20–30 | 60 | 2 | 10.50 | Smooth |
| 8 | 16–20 | 30 | 2 | 10.30 | Smooth |
| 9 | 16–20 | 10 | 2 | 8.30 | Smooth |
| 10 | 16–20 | 10 | 3 | 10.80 | Smooth |
| 11 | 16–20 | 10 | 4 | 10.75 | Smooth |

The results show that there is a great increase in stiffening action in the resin layer where the granular size is larger than 30 mesh. Note particularly that Test 4 which included all portions of a commercial granular material finer than 16 mesh had a stiffness of only 7.75 lbs. in contrast with Test 3 which had a stiffness of 11 lbs. where those granules smaller than 30 mesh were eliminated from the applied granules. There is also an increase in stiffness where the smaller particles in the range of 10–30 are eliminated, note that the stiffness of Test 6 was 15.4 lbs. where the granules were in the range of from 10–16 as contrasted with the stiffness of Test 5, 10.80 lbs., where the granules were from 10 mesh to 30 mesh. The use of the coarser granules results in some showthrough or roughness in the area where the layer of polymeric resin is thinner, i.e., at the feather line. This minor roughness is not objectionable with many shoe upper materials but, in fact, the stiffness of greater than 10 where the granules finer than 30 mesh have been screened out is adequate for most purposes and is substantially greater than the stiffness which can be secured without use of granules.

Referring to Tests 2 and 8 to 11, it can be observed that using a 2 second press time, there is a significant falling off in the stiffness of the assembly as the pressure is reduced successively from 60 p.s.i., to 30 p.s.i. and 10 p.s.i. That is, the stiffness decreases respectively from 11.50 lbs. to 10.30 lbs. to 8.30 lbs. It was found, however, that even at the low pressure of 10 p.s.i., minor increases in press time produced substantial increases in stiffness. Thus, from a stiffness of only 8.30 lbs. where the pressure time was only 2 seconds as in Test 9, the stiffness increased to almost 11 lbs. in Tests 10 and 11 in which the press time was raised to 3 and 4 seconds.

Having thus described our invention and what we claim as new and desire to secure as Letters Patent of the United States is:

1. The method for stiffening a selected area of a shoe component of flexible sheet material comprising the steps of applying, in hot viscous molten state, a coating of synthetic polymeric material which will harden to stiff, resilient condition on the selected area of said shoe component, said coating being restricted to said selected area, applying free granules of rigid material of which the surface is readily wet by said molten material of the coating while exposed portions of the coating are in heated softened adhesive condition to cause said granules to adhere to said coating in a uniform single layer of granules, said granules having a size of at least about one-half the thickness of the coating and being present in amount of from about one-half up to a weight about equal to the weight of the polymeric material, said material being substantially harder than said polymeric material at the temperature of use of said shoe component and not being softened to freely fluid state by the heat of said molten material, pressing said first shoe component aainst a second shoe component of flexible sheet material with said coating and granules between the said components and with said coating in heat-softened condition to force said coating through spaces between said granules into adhesive engagement with said second shoe component with said granules embedded in the coating and cooling said coating to stiff resilient condition with said rigid granules locked therein as reinforcing stiffening bodies.

2. The method for stiffening a selected area of a shoe component as defined in claim 1 in which said granules are applied by directing a stream of the granules against said coating while said coating is in heated, soft adhesive condition to cause said granules to adhere in a single layer.

3. The method for stiffening a selected area of a shoe component as defined in claim 1 in which the material of said granules is a resin which is softened but not freely fluid at the time said first shoe component is pressed against said second shoe component.

4. The method for stiffening a selected area of a shoe component as defined in claim 3 in which fine fibrous filler is dispersed in the resin of said granules and the resin of said granules is an uncured heat-softenable thermosetting resin and in which the assembly of first and second sheets with said coating and said granules between them is heated to a temperature sufficient to soften the coating and the granules and said assembly is pressed in heated condition to force said coating substantially to fill the spaces between said granules and to bring said coating into intimate engagement with the surface of said second sheet.

5. A method for stiffening a selected area of a shoe component as defined in claim 3 in which pressure is applied after heating to shape said shoe component to a desired three-dimensional configuration.

6. A method for stiffening a selected area of a shoe component as defined in claim 5 in which said granules comprise uncured thermosetting phenol formaldehyde resin and in which the temperature of reheating is above the softening point of said resin.

7. The method for stiffening a selected area of a shoe component as defined in claim 3 in which the weight of said granules per unit area is from about ½ to about 1 times the weight of the coating material and in which pressure is applied after heating to shape said shoe component to a desired three-dimensional configuration.

8. The method for stiffening a selected area of a shoe component as defined in claim 7 in which the synthetic polymeric material of said coating is a polyamide resin, the thickness of said coating is from about 0.02 inch to about 0.045 inch, the resin of said granules is an uncured thermosetting phenol formaldehyde resin containing from about 25% to about 100% by weight based on the weight of the resin of a fibrous filler and the size of said granules is from about 0.025 inch to about 0.050 inch.

* * * * *